United States Patent
Vargas Linan et al.

(10) Patent No.: US 11,007,952 B2
(45) Date of Patent: May 18, 2021

(54) MAGNET FASTENER ASSEMBLY AND BASE THEREFOR WITH RELATIVELY RIGID UPSTANDING DOGHOUSE ON A RELATIVELY FLEXIBLE SUPPORT

(71) Applicant: FORD GLOBAL TECHNOLOGIES, LLC, Dearborn, MI (US)

(72) Inventors: Eric Vargas Linan, Metepec (MX); Edgar Javier Ortega Garcia, Tlalnepantla (MX); Jesus Manuel Perez Hernandez, Cuahutemoc (MX)

(73) Assignee: Ford Global Technologies, LLC, Dearborn, MI (US)

( * ) Notice: Subject to any disclaimer, the term of this patent is extended or adjusted under 35 U.S.C. 154(b) by 41 days.

(21) Appl. No.: 15/973,667

(22) Filed: May 8, 2018

(65) Prior Publication Data
US 2019/0344728 A1    Nov. 14, 2019

(51) Int. Cl.
| B60R 13/02 | (2006.01) |
| B29C 45/16 | (2006.01) |
| F16B 1/00 | (2006.01) |
| B29L 31/30 | (2006.01) |

(52) U.S. Cl.
CPC ...... B60R 13/0206 (2013.01); B29C 45/1676 (2013.01); F16B 1/00 (2013.01); B29C 2045/1678 (2013.01); B29K 2995/007 (2013.01); B29L 2031/3011 (2013.01); B60R 13/0212 (2013.01); F16B 2001/0035 (2013.01)

(58) Field of Classification Search
CPC ............ B60R 13/0206; B60R 13/0212; B29C 45/1676; F16B 1/00; F16B 11/006; F16B 2001/0035; F16B 5/0657; B29K 2995/007; B29L 2031/3011
See application file for complete search history.

(56) References Cited

U.S. PATENT DOCUMENTS

| 6,955,376 B1 * | 10/2005 | Labrie ..................... B29C 45/14 280/728.3 |
| 7,306,190 B2 | 12/2007 | Tisol, Jr. |
| 7,922,135 B2 * | 4/2011 | Granata ................... F16B 5/126 248/206.5 |
| 8,555,468 B2 | 10/2013 | Moerke |
| 9,499,108 B2 | 11/2016 | Dickinson et al. |
| 2012/0014766 A1 * | 1/2012 | Kirchen .............. B60R 13/0206 411/508 |
| 2015/0283957 A1 * | 10/2015 | Dickinson ........... B60R 13/0206 24/303 |
| 2016/0040693 A1 | 2/2016 | Popovski et al. |
| 2016/0129854 A1 * | 5/2016 | Bachelder ............. F16B 5/0657 24/292 |
| 2017/0106809 A1 | 4/2017 | Tirrell et al. |
| 2018/0045190 A1 * | 2/2018 | Ezzo ..................... F04B 45/043 |
| 2019/0030858 A1 * | 1/2019 | Kameda ................. B32B 27/32 |
| 2019/0271343 A1 * | 9/2019 | Perez Hernandez .. B62D 27/06 |

* cited by examiner

*Primary Examiner* — Robert Sandy
*Assistant Examiner* — David M Upchurch
(74) *Attorney, Agent, or Firm* — David Coppiellie; King & Schickli, PLLC

(57) ABSTRACT

A magnet fastener assembly includes a base, a magnet carrier held in the base and a magnet held in the magnet carrier. The base includes a one-piece body having an upstanding doghouse on a support. The support is made from a first material and the doghouse is made from a second material. The first material has more flexibility than the second material and the second material has a greater rigidity than the first material.

9 Claims, 4 Drawing Sheets

MAGNET FASTENER ASSEMBLY AND BASE THEREFOR WITH RELATIVELY RIGID UPSTANDING DOGHOUSE ON A RELATIVELY FLEXIBLE SUPPORT

TECHNICAL FIELD

This document relates generally to the motor vehicle equipment field and, more particularly, to a new and improved magnet fastener assembly as well as a base for a magnet fastener assembly having a one-piece body with a relatively rigid upstanding doghouse on a relatively flexible support.

BACKGROUND

Magnet fastener assemblies may be utilized to attach the headliner to the roof sheet metal substrate of a motor vehicle. In certain motor vehicles, the design and shape of the headliner may incorporate variations in contour and/or thickness. In the past this has typically necessitated the design and use of multiple magnet fastener assemblies in order to properly connect the headliner to the roof sheet metal substrate.

This document relates to a new and improved magnet fastener assembly and base for a magnet fastener assembly. That base includes a relatively rigid upstanding tower or doghouse to hold the magnet carrier of the magnet fastener assembly. That relatively rigid upstanding doghouse is provided on a relatively flexible support that has the necessary flexibility to conform to the contour of the headliner including any variations in contour or thickness. Accordingly, a new and improved magnet fastener assembly provides versatility that accommodates many variations in the headliner. Consequently, for many applications the new and improved magnet fastener assembly may be utilized to connect a headliner to a roof sheet metal substrate where multiple magnet fastener assemblies of different designs would have been required for this purpose in the past. Accordingly, the new and improved magnet fastener assembly saves time in vehicle design, saves cost, reducing the number of molds for each program, and simplifies assembly and installation of the headliner.

SUMMARY

In accordance with the purposes and benefits described herein, a new and improved base is provided for a magnet fastener assembly. That base comprises a one-piece body having an upstanding doghouse on a support wherein the support is made from a first material and the doghouse is made from a second material. The second material has a greater rigidity than the first material. The first material has a greater flexibility than the second material.

The first material may comprise an elastomer while the second material may comprise a plastic. More particularly, the first material may be selected from a first group of materials consisting of rubber, Neoprene, silicone rubber, Thermoplastic Elastomer (TPE), Flexible PVC and combinations thereof. The second material may be selected from a second group of materials consisting of acrylonitrile butadiene styrene (ABS), Nylon, Polyoxymethylene/Acetal (POM), Polypropylene (PP), Poly Phenylene Oxide (PPO) and combinations thereof.

The doghouse may include a top wall having a magnet carrier receiver. Further, the doghouse may include a sidewall having an entry slot in communication with the magnet carrier receiver. This entry slot allows connection of a magnet carrier to the base.

The support may be substantially planar. Further, the support may include a plurality of apertures which may be filled with adhesive to help secure the base and interlock to the headliner.

In accordance with an additional aspect, a new and improved magnet fastener assembly is provided. That magnet fastener assembly comprises a base, a magnet carrier held in the base and a magnet held in the magnet carrier. The base may include a one-piece body having an upstanding doghouse on a support. The support may be made from a first material and the doghouse may be made from a second material. The second material has a greater rigidity than the first material. The first material has a greater flexibility than the second material.

The first material may be an elastomer and the second material may be a plastic. More particularly, the first material may be selected from a first group of materials consisting of rubber, Neoprene, silicone rubber, Thermoplastic Elastomer (TPE), Flexible PVC and combinations thereof. The second material may be selected from a second group of materials consisting of acrylonitrile butadiene styrene (ABS), Nylon, Polyoxymethylene/Acetal (POM), Polypropylene (PP), Poly Phenylene Oxide (PPO) and combinations thereof.

The doghouse may include a top wall having a magnet carrier receiver. Further, the doghouse may include a sidewall having an entry slot in communication with the magnet carrier receiver. The support may be substantially planar. Further, the support may include a plurality of apertures adapted to receive an adhesive used to secure the support to the headliner.

The magnet carrier may include an umbrella and a stem. Further, the magnet carrier may include two retainers defining a channel that receives a margin of the top wall of the doghouse, outlining the magnet carrier receiver, when the magnet fastener assembly is properly assembled.

In accordance with still another aspect, a method is provided of producing a base for a magnet fastener assembly. That method comprises the steps of: (a) injecting a first material into a mold to form a support of the base, (b) injecting a second material into the mold to form an upstanding doghouse of the base and (c) removing the base from the mold in one piece.

The method may also include the step of opening the mold prior to removing the base from the mold. Further, the method may include the step of making the base using a two-shot injection molding process. Further, the method may include selecting a first material having greater flexibility than the second material and the second material having greater rigidity than the first material.

In the following description, there are shown and described several preferred embodiments of the base for a magnet fastener assembly, a magnet fastener assembly and a method of producing a base for a magnet fastener assembly. As it should be realized, the base, the magnet fastener assembly and the method are capable of other, different embodiments and their several details are capable of modification in various, obvious aspects all without departing from the base, magnet fastener assembly and method as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the base, the magnet fastener assembly incorporating that base as well as a method of producing the base and together with the description serve to explain certain principles thereof.

Reference will now be made in detail to the present preferred embodiments of the base and the magnet fastener assembly, examples of which are illustrated in the accompanying drawing figures.

DETAILED DESCRIPTION

Figure 1:
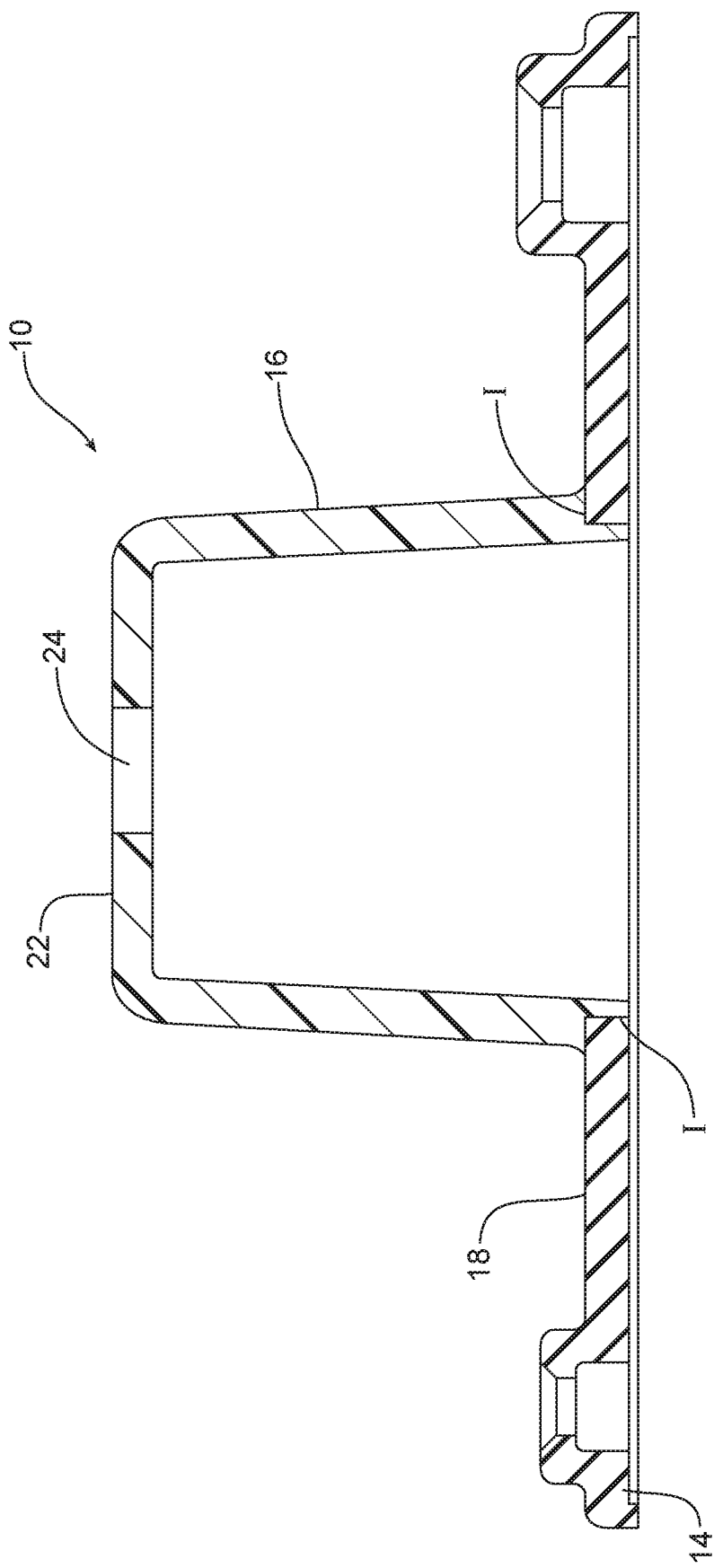
FIG. 1 is a cross-sectional view of the new and improved base for a magnet fastener assembly.
Figure 2:
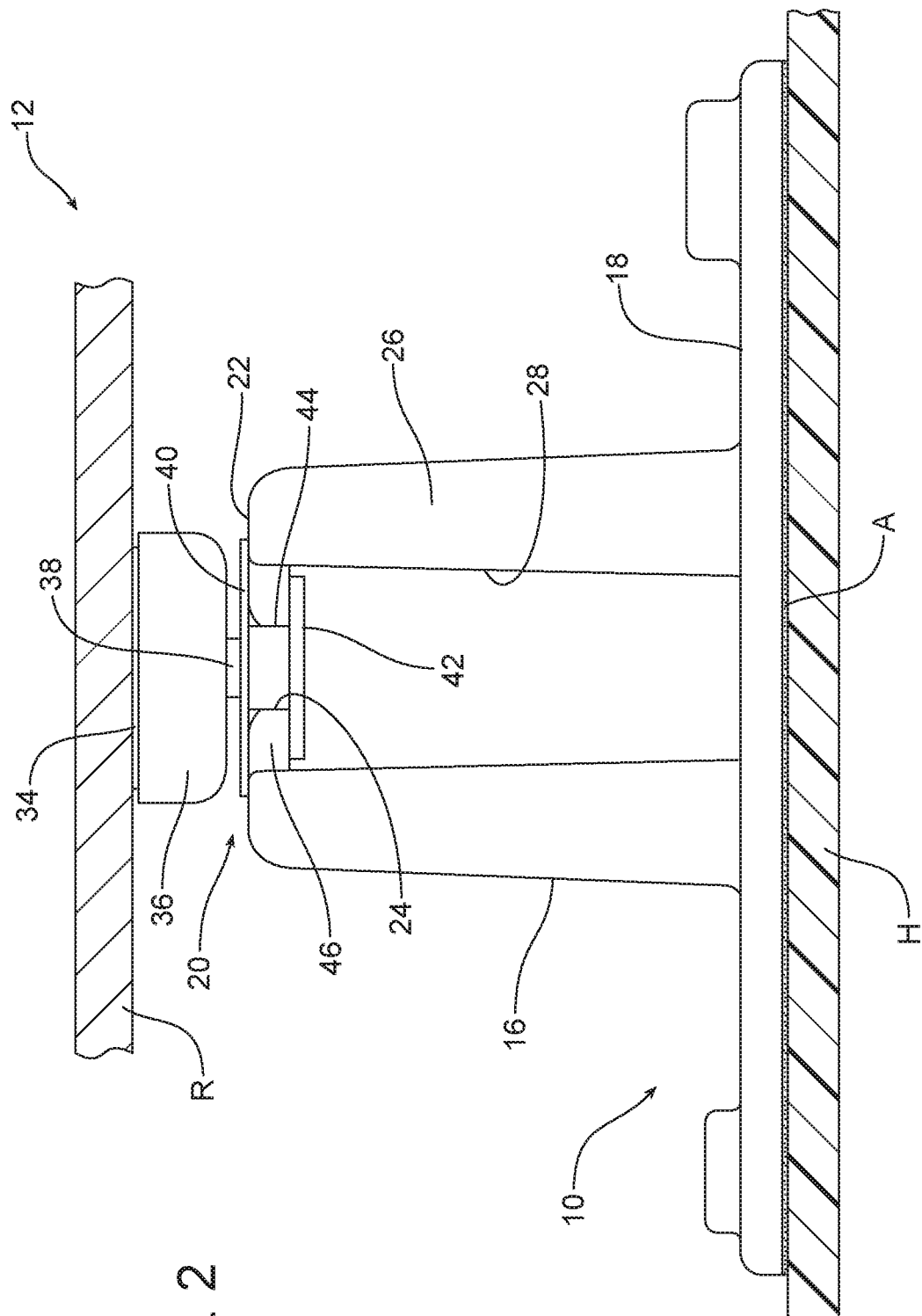
FIG. 2 is a side elevational view of a new and improved magnet fastener assembly incorporating the base illustrated in FIG. 1.
Figure 3:
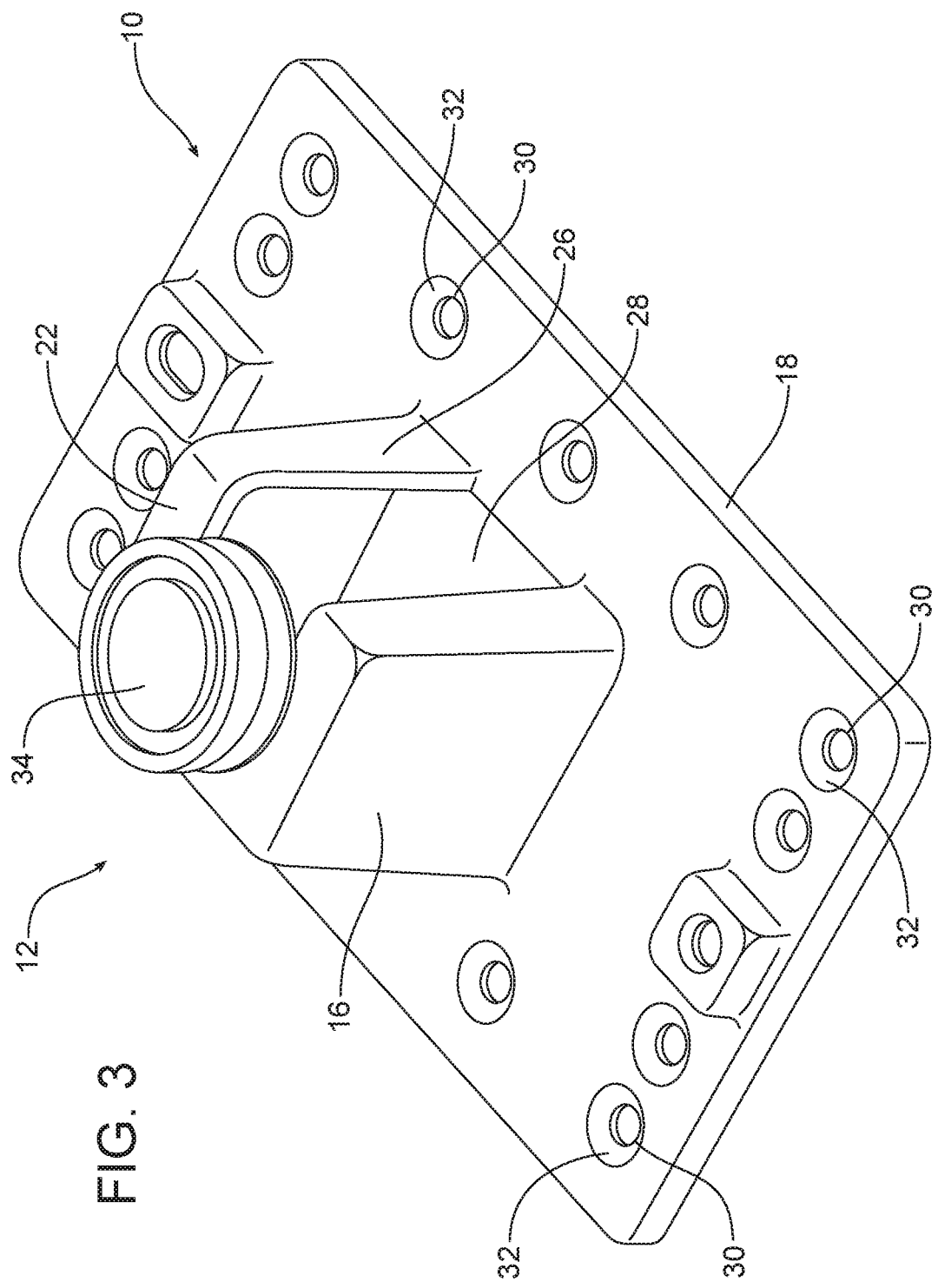
FIG. 3 is a perspective view of the magnet fastener assembly illustrated in FIG. 2 illustrating that magnet fastener assembly resting on a headliner.

Reference is now made to FIG. 1, illustrating the new and improved base 10 as well as to FIGS. 2 and 3 illustrating the new and improved magnet fastener assembly 12 incorporating that base.

As best illustrated in FIG. 1, the base 10 comprises a one-piece body 14 having an upstanding tower or doghouse 16 projecting from a support 18. The support 18 is made from a first material and the doghouse 16 is made from a second material. The first material is more flexible than the second material and the second material has a greater rigidity than the first material.

More particularly, the first material is selected in order to have the necessary flexibility to conform with variations in the contour and thickness of a headliner H. Toward this end, the first material may be an elastomer. More particularly, the first material may be selected from a first group of materials consisting of rubber, Neoprene, silicone rubber, Thermoplastic Elastomer (TPE), Flexible PVC and combinations thereof. Here it should be noted that the specific materials listed for the support 18 are presented for purposes of illustration and are not considered to be restrictive.

The second material is selected to provide sufficient rigidity and strength to properly hold a magnet carrier 20 as described in greater detail below. The second material may comprise a plastic, such as a structural plastic. The second material may be selected from a second group of materials consisting of, for example, acrylonitrile butadiene styrene (ABS), Nylon, Polyoxymethylene/Acetal (POM), Polypropylene (PP), Poly Phenylene Oxide (PPO) and combinations thereof. Here it should be noted that the specific materials listed for the doghouse 16 are presented for purposes of illustration and are not considered to be restrictive.

In the illustrated embodiment, the doghouse 16 includes a top wall 22 having a magnet carrier receiver 24. Further, the doghouse 16 includes a sidewall 26 having an entry slot 28 in communication with the magnet carrier receiver 24. That entry slot 28 allows one to insert the magnet carrier 20 into the magnet carrier receiver 24.

Figure 4:
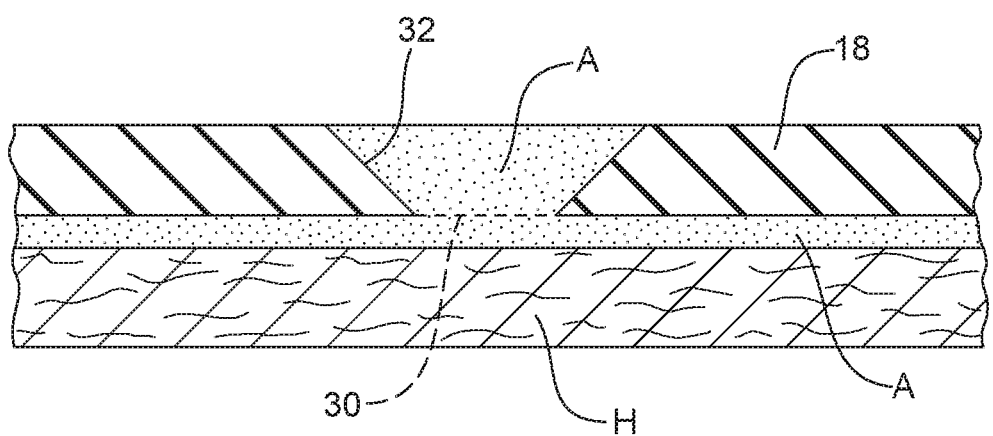
FIG. 4 is a detailed cross-sectional view showing how the adhesive filling the aperture in the support interlocks the base to the headliner via engagement with the conical sidewall of the aperture.

The support 18 of the illustrated embodiment is substantially planar. Further, as best illustrated in FIG. 3, the support 18 includes a plurality of apertures 30 with conically-shaped sidewalls 32. When the base 10 is secured to the headliner H with an adhesive A, that adhesive may partially or completely fill the apertures 30. Accordingly, when the adhesive A sets, the adhesive-filled apertures provide interlocking attachment between the base 10 and the headliner H. Note FIG. 4 showing how the adhesive A engages the conical sidewall 32 of each aperture 30 effectively interlocking the base 10 to the headliner H when cured.

As best illustrated in FIGS. 2 and 3, the magnetic fastener assembly 12 comprises the base 10, described in detail above, the magnet carrier 20 that is held in the base and a magnet 34 held in the magnet carrier.

More particularly, the magnet carrier 20 includes an umbrella 36 and a stem 38. Further, the magnet carrier 20 includes a retaining feature including two retainers 40, 42 in the shape of discs that define a channel 44 therebetween. When the magnet carrier 20 is properly connected to and seated on the top wall 22 of the base 10, a margin 46 of the top wall outlining the magnet carrier receiver 24 is received and held in the channel 44. The magnet 34 nests in the umbrella 36 at the top of the stem 38.

FIG. 2 illustrates the assembled magnet fastener assembly 12. Adhesive A secures the base 10 to the headliner H (see also FIG. 4). The magnet 34 is attracted to the overlying sheet metal substrate R thereby securing the headliner H in position.

The base 10 with the one-piece body 14 may be produced using a two-shot injection molding process. Accordingly, a method of producing the base 10 may comprise the steps of: (a) injecting a first material into a mold to form the support 18 of the base 10. In addition, the method includes the step of injecting a second material into the mold to form the upstanding doghouse 16 of the base 10. The doghouse 16 and the support 18 fuse together at the interface I of the doghouse and support (see FIG. 1) thereby producing the one-piece body 14. The method also includes the steps of opening the mold and removing the base from the mold in one piece. The method also includes selecting a first material for the support 18 having greater flexibility than the second material selected for the doghouse 16. The second material for the doghouse 16 has greater rigidity than the first material selected for the support 18.

The magnet fastener assembly 12 incorporating the base 10 having a one-piece body 14 as described herein provides a number of benefits and advantages. The magnet fastener assembly 12 can be used for many different programs and applications thereby reducing the number of molds that need to be constructed as well as reducing complexity and time in design. Advantageously, the relatively flexible support 18 is adapted to conform to different contours, shapes and thicknesses of headliners H thereby eliminating the need in the past to utilize multiple magnet fastener assemblies of different design to accommodate such variations.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A magnet fastener assembly, comprising:
a base including a one-piece body having an upstanding doghouse on a support wherein said support is made from a first material and said doghouse is made from a second material, said second material having a greater rigidity than said first material;
a magnet carrier held in said base; and
a magnet held in said magnet carrier.

2. The magnet fastener assembly of claim 1, wherein said first material is an elastomer and said second material is a plastic.

3. The magnet fastener assembly of claim 2, wherein said first material is selected from a first group of materials consisting of rubber, Neoprene, silicone rubber, Thermoplastic Elastomer (TPE), Flexible PVC and combinations thereof and said second material is selected from a second group of materials consisting of acrylonitrile butadiene styrene (ABS), Nylon, Polyoxymethylene/Acetal (POM), Polypropylene (PP), Poly Phenylene Oxide (PPO) and combinations thereof.

4. The magnet fastener assembly of claim 2, wherein said doghouse includes a top wall having a magnet carrier receiver.

5. The magnet fastener assembly of claim 4, wherein said doghouse includes a sidewall having an entry slot in communication with said magnet carrier receiver.

6. The magnet fastener assembly of claim 5, wherein said support is substantially planar.

7. The magnet fastener assembly of claim 6, wherein said support includes a plurality of apertures.

8. The magnet fastener assembly of claim 7, wherein said magnet carrier includes an umbrella and a stem.

9. The magnet fastener assembly of claim 8, wherein said magnet carrier includes two retainers defining a channel receiving a margin of said top wall outlining said magnet carrier receiver.

* * * * *